US006990578B1

(12) United States Patent
O'Brien et al.

(10) Patent No.: US 6,990,578 B1
(45) Date of Patent: Jan. 24, 2006

(54) METHOD AND APPARATUS FOR ENCRYPTING ELECTRONIC MESSAGES COMPOSED USING ABBREVIATED ADDRESS BOOKS

(75) Inventors: Michael R. O'Brien, Westford, MA (US); Steven R. Beckhardt, Nashua, NH (US); Elizabeth A. Lorenson, Littleton, MA (US); Douglas W. Conmy, Nashua, NH (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/431,344

(22) Filed: Oct. 29, 1999

(51) Int. Cl.
*H04L 9/00* (2006.01)
*H04K 1/00* (2006.01)
(52) U.S. Cl. .................... 713/156; 713/160; 705/51
(58) Field of Classification Search ............. 713/156, 713/168, 170, 160, 161, 153, 200, 201; 709/200, 709/206
See application file for complete search history.

(56) References Cited

U.S. PATENT DOCUMENTS

| | | | | |
|---|---|---|---|---|
| 5,552,897 A | * | 9/1996 | Mandelbaum et al. | 358/400 |
| 5,778,071 A | * | 7/1998 | Caputo et al. | 713/159 |
| 5,815,577 A | * | 9/1998 | Clark | 380/52 |
| 5,903,651 A | * | 5/1999 | Kocher | 713/158 |
| 6,055,240 A | * | 4/2000 | Tunnicliffe | 370/428 |
| 6,292,895 B1 | * | 9/2001 | Baltzley | 713/168 |
| 6,356,937 B1 | * | 3/2002 | Montville et al. | 709/206 |
| 6,381,695 B2 | * | 4/2002 | Kudo et al. | 713/156 |
| 6,430,691 B1 | * | 8/2002 | Di Santo et al. | 713/192 |
| 6,609,114 B1 | * | 8/2003 | Gressel et al. | 705/50 |
| 2002/0161709 A1 | * | 10/2002 | Floyd et al. | 705/51 |

OTHER PUBLICATIONS

How to Set up the Paladin E-mail Client, www.circa.ufl.edu/handouts/softdist/paladin/paladin.html, pp. 1-6, Aug. 18, 1997.*
Crocker, D., Standard for the Format of ARPA Internet Text Messages, RFC-822, IETF, pp. 1-39, Aug. 13, 1982.*
PGP for Personal Privacy, v 5.5, User Guide, Nework Associates, Inc., pp. 1-150, 1998.*
Ramsdell, B., S/MIME Version 3 Message Specification, RFC-2633, pp. 1-24, Jun. 1999.*
How to Set up the Paladin E-mail Client, www.circa.ufl.edu/handouts/softdist/paladin/paladin.html, pp. 1-6, Aug. 18, 1997.*
Crocker, D., "Standard for the Format of ARPA Internet Text Messages", RFC-822, IETF, pp. 1-42, Aug. 13, 1982.*

* cited by examiner

*Primary Examiner*—Emmanuel L. Moise
*Assistant Examiner*—Courtney Fields
(74) *Attorney, Agent, or Firm*—Kudirka & Jobse, LLP

(57) ABSTRACT

When electronic mail is to be sent by an off-line user to a recipient who holds a digital certificate, the sender's mail program allows the sender to compose the mail, but the mail is placed in plain text in the sender's local outbox and flagged for subsequent encryption. When the sender later connects to a mail server to send the outgoing mail, the sender's mail software, in response to the flagged mail will request the recipient's certificate from the server and use the received certificate to encrypt the mail message before it leaves the sender's workstation. In accordance with one embodiment of the invention, after using a digital certificate to encrypt a mail message, the certificate is discarded. In accordance with another embodiment, if the certificate is not available or located by the mail server, a message is sent to the sender informing him that the certificate cannot be located and the mail cannot be sent in encrypted form. At that point, the sender has an option to resend the mail in unencrypted form.

20 Claims, 5 Drawing Sheets

METHOD AND APPARATUS FOR ENCRYPTING ELECTRONIC MESSAGES COMPOSED USING ABBREVIATED ADDRESS BOOKS

FIELD OF THE INVENTION

This invention relates to distributed groupware systems, including e-mail, and address books and information management.

BACKGROUND OF THE INVENTION

Initially, computer systems were designed to support large organizations because the expense of early computers required that they address major organizational goals. These early computer systems included large mainframe minicomputer applications. However, the spread of personal computers created large markets for applications designed for individual users, such as spreadsheets and word processors. The cost of computation soon became inexpensive enough to be available to all members of some groups and a technological infrastructure, including networks and associated software, also became available. Both of these latter facts encouraged applications which supported communication and coordination between individual computers users. These interactive applications became more popular and, in the mid-1980s, the terms "groupware", "collaborative computing", "workgroup computing", and "multi-user applications" were coined to describe such interactive or collaborative applications.

Conferencing applications, including desktop conferencing and videoconferencing, electronic mail, meeting support systems and group calendars are examples of groupware. However, early groupware systems suffered from the lack of integrated applications which allowed the different pieces of groupware system to operate together. Subsequently, several companies developed integrated groupware systems. One of the more popular of these integrated systems is the Notes™ groupware system developed and marketed by the Lotus Corporation, 55 Cambridge Parkway, Cambridge, Mass. "The Notes system is an information manager for workgroups which allows a group of people to share information across a computer network and combines e-mail, a shared calendar and shared databases in a client/server configuration. A Notes system consists of end-user workstation programs called "Notes clients" and one or more central server programs which provides services to the end users. Each server connects clients, routes mail, stores common information in one or more databases and determines how databases are shared among users. Users may also store in local workstation databases managed by the client software. The servers and the users are all connected together by a network. More recently, the Internet has arisen as a global, public information service which is becoming more and more popular. An extension of the basic Notes system called a Domino Web Server allows Notes databases to be accessed through a conventional web browser, such as Netscape Navigator™ or Microsoft Internet Explorer™. Users can then access Notes databases without installing Notes client software on every computer.

The Notes system also allows multiples copies, called "replicas," of the same database to be kept on different servers or workstations. Replicas speed operation of the system by allowing users on a variety of network and at a variety of locations to access the same information. Replicas exchange information in a process called "replication" in order to make the information in each replica identical to the information in other replicas over time. For example, users in a first location can make changes to the information in a replica located in a server associated with the first location at the same time that other users make changes to information in a second replica of the same database located in a second server at another location. Later, during the replication process, when the first and second servers replicate, information will be exchanged among the replicas to make the information the same in both replicas.

In use, the Notes system can be configured for one or more "domains", each of which is an organization of Notes servers that are centrally managed for server administration and security. All servers in a domain share a single database called a "public address book." The public address book provides a directory of Notes servers, users, certifiers, domains, groups, connections and profiles. The public address book can also contain security information for each user that can include, for example, a digital "certificate" which is often a public key from a public/private key pair that is used with a conventional encryption/decryption algorithm to encrypt and decrypt e-mail message content.

The Notes system contains a number of features that make its use easier and more efficient. For example, a feature called "look ahead typing" allows a user to enter the beginning portion of a recipient's name in an e-mail address field and the Notes system will access the public address book to retrieve matching information to complete the name and provide the related information. Searching by recipient name is also provided. When a match is detected by the Notes system, additional information such as whether the mail should be encrypted, and, if so, the recipient's digital certificate can also be retrieved from the address book.

It is also possible for a user to use the Notes system with a remote or mobile computer, such as a laptop, that is not connected to a network or the Internet. In order to operate off-line, a user makes a replica of a database with the remote computer while the remote computer is connected to the Notes system via a network. The user then disconnects from the network and can operate in a normal manner. When the user later reconnects to the network, a replication operation is performed and the database in the remote computer is updated with the database replica in the Notes system.

In order for features such as the type-ahead and searching function to be available to a remote user, a copy of the public address book must also be placed on the remote computer. However, in large enterprises which may have many Notes domains, several different public address books may exist. If all of these are combined, to form one large address book the overall size would generally be too large for most remote computers, such as laptop computers. Therefore, the various public address books are compressed or abbreviated by means of a program called an "aggregator" which generates an abbreviated address book called a "directory catalog" which contains some of the information of the public address books, but is much smaller in size.

A problem arises when a remote user who is not connected to the Notes system attempts to use such a directory catalog to send an e-mail to a recipient listed in the catalog. The digital certificates which are used to encrypt e-mail are typically 1K–2K bytes in length, but may be up to 20K bytes in length. Because of this significant length, they are typically not included in the directory catalog. Therefore, if a user operating remotely and "off-line" attempts to send e-mail to a recipient where the e-mail must be encrypted, the digital certificate will not be available. Since information in the directory catalog records whether a user has a certificate or not, the e-mail routine will not allow the mail to be composed.

Therefore, there is a need to provide e-mail capabilities to an off-line groupware user who is operating with an abbreviated address book.

SUMMARY OF THE INVENTION

In accordance with one illustrative embodiment of the invention, when mail is to be sent by an off-line user to a recipient who holds a digital certificate, the sender's mail program allows the sender to compose the mail, but the mail is placed in plain text in the sender's local outbox and flagged for subsequent encryption. When the sender later connects to a mail server to send the outgoing mail, the sender's mail software, in response to the flagged mail will request the recipient's certificate from the server and use the received certificate to encrypt the mail message before it leaves the sender's workstation.

In accordance with one embodiment of the invention, after using a digital certificate to encrypt a mail message, the certificate is discarded.

In accordance with another embodiment, if the certificate is not available or located by the mail server, a message is sent to the sender informing him that the certificate cannot be located and the mail cannot be sent in encrypted form. At that point, the sender has an option to resend the mail in unencrypted form.

BRIEF DESCRIPTION OF THE DRAWINGS

The above and further advantages of the invention may be better understood by referring to the following description in conjunction with the accompanying drawings in which.

DETAILED DESCRIPTION

Figure 1:
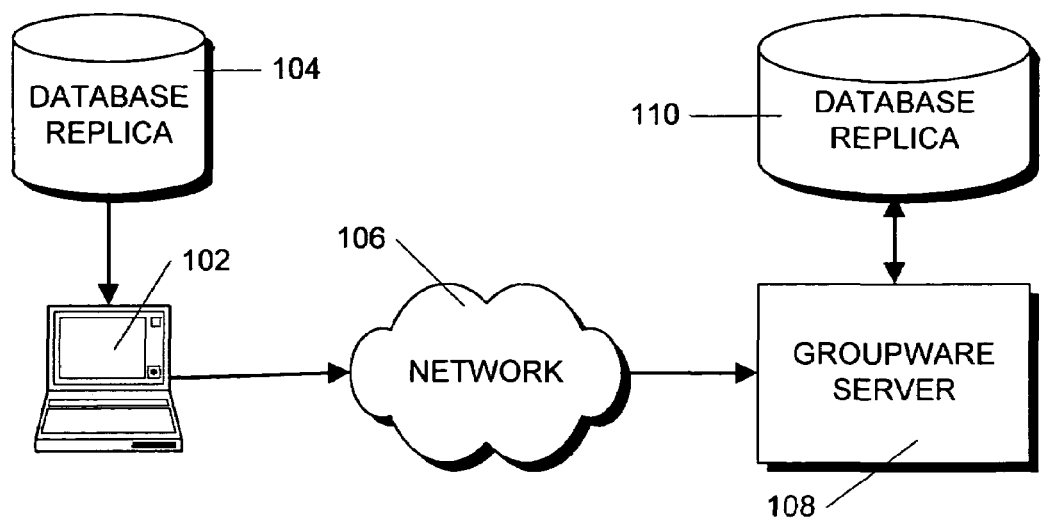
FIG. 1 is a schematic block diagram of a conventional remote user connected, via a network, to a groupware system illustrating replicated databases in the remote user's computer and the groupware server.

FIG. 1 illustrates a prior art groupware system in which a remote, or mobile, user can be connected, via a network, to a server which provides electronic mail, calendar and database services to the user. In the description which follows below, a Notes groupware system, as previously described, is used as an illustrative example. However, other available groupware systems, such as the Exchange groupware system, developed and marketed by the Microsoft corporation, Redmond, Wash., can also be used in accordance with the principles of the present invention.

As illustrated in FIG. 1, a remote computer, such as a laptop computer 102, can be connected, via network 106, to a groupware server 108. The laptop computer 102 contains a database replica 104 which is, in turn, a copy of the database replica 110 associated with the groupware server 108. As previously mentioned, the groupware system insures that, over time, databases 104 and 110 contain the same information. After any updates to database replicas 104 and 110 have been performed, the user of laptop 102 can disconnect laptop 102 from network 106 and operate "off line". In particular, the user of computer 102 can access database 104 which is stored in the local memory of computer 102. As previously mentioned, database 104 may contain a directory catalog or an abbreviated address book which can contain a directory of users that are connected to notes server 108 and other notes servers (not shown on FIG. 1.)

Figure 2:
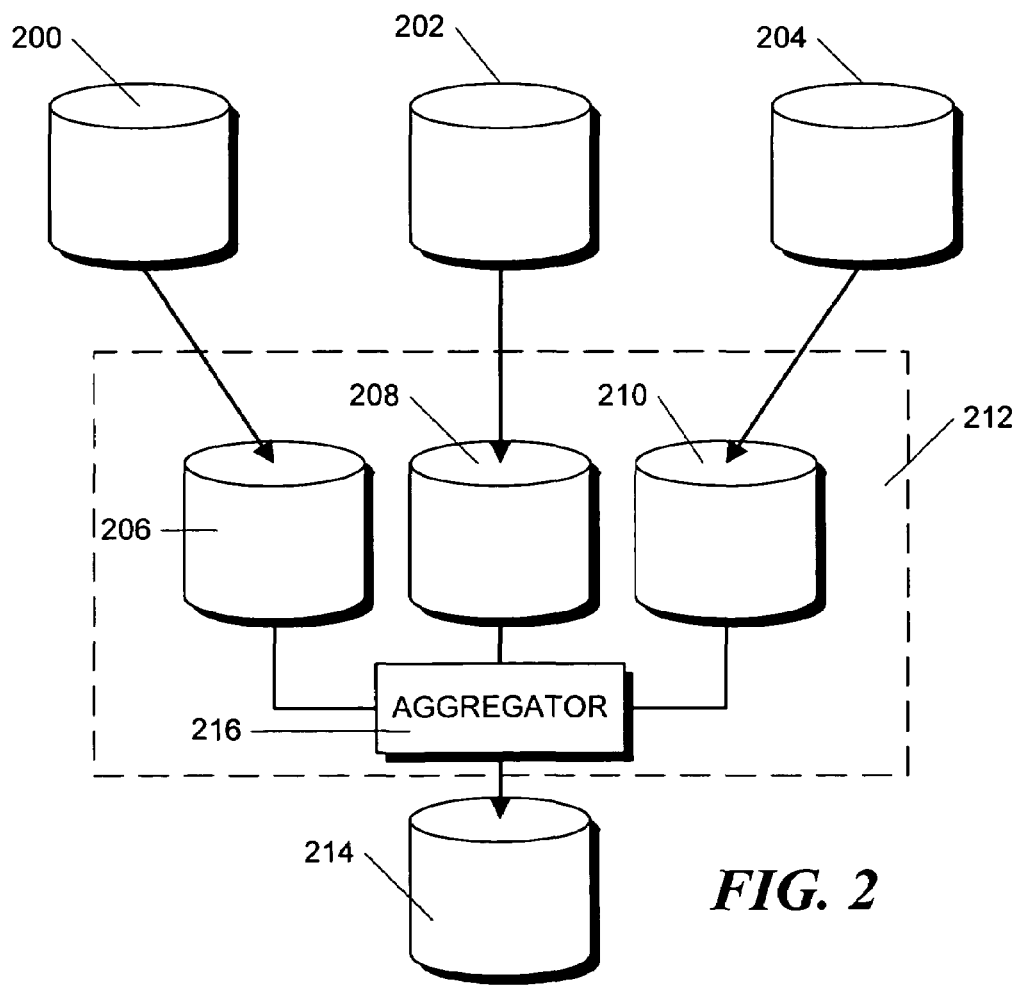
FIG. 2 is a block schematic illustrating a known process of creating an abbreviated address book for use on a remote client from a plurality of public address books available on groupware servers.

Database 104 may contain an abbreviated directory or directory catalog. Such an abbreviated directory is created in the manner shown in schematic form in FIG. 2. In the example shown, three public address books 200, 202 and 204, also called "source domain directories", are used to generate a single abbreviated address book or directory catalog 214. A directory server 212, generates and maintains the directory catalog 214. During the generation process, replicas 206, 208 and 210 of public address books 200, 202 and 204, respectively, are created in the server 212. A special program 216 in server 212, called an aggregator, populates the directory catalog database 214 and keeps the catalog 214 in synchronism with the source domain directories 200, 202 and 204.

The directory server 212 takes the changes from the multiple sources 202, 204 and 206 and then replicates the changes made to the source domain directories into the catalog 214, eliminating duplicates. However, all of the information in each entry in source domain directories 200, 202 and 204 is not copied to abbreviated address book 214. Instead, a record is created in address book 214 by aggregator 216 which record is an abbreviated or condensed version of an address book entry. Information which consumes a disproportionate share of space in the original entry is eliminated in the condensed entry. Such information includes digital certificates which can consume up to 20 K bytes.

The first time the aggregator 216 runs, it opens all of the public address books replicas 206, 208 and 210 on the directory server 212 and creates reduced entries from these replicas, thereby creating the directory catalog 214. Replicas of the directory catalog 214 can then be distributed throughout the enterprise in a variety of known manners, including replicating the directory catalog 214 to the groupware servers, downloading the directory catalog 214 to client workstations, via e-mail or database links, and pushing the directory catalog to client workstations during the workstation setup process.

Figure 3:
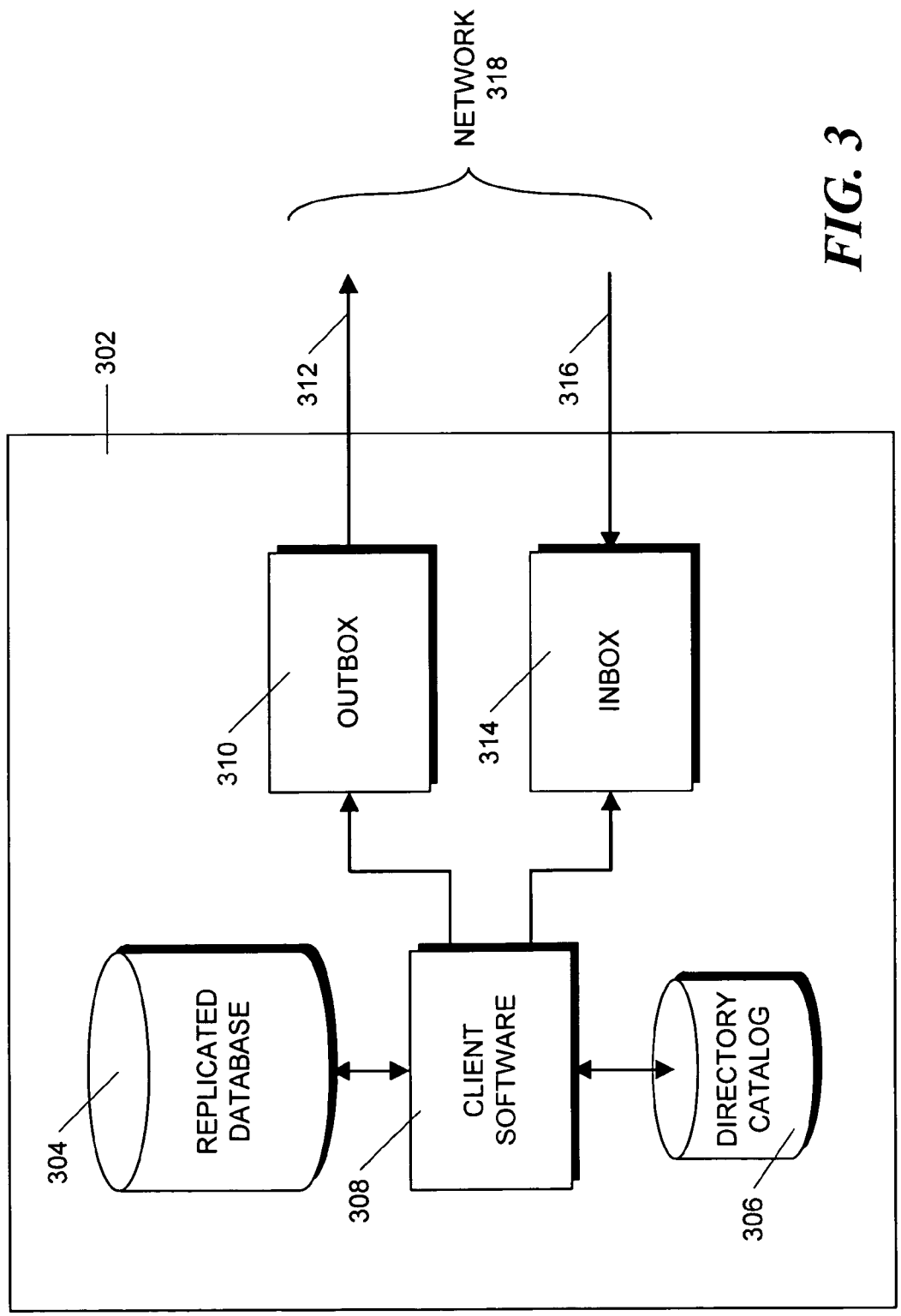
FIG. 3 is a block schematic diagram of a conventional remote client illustrating a replicated database, abbreviated address book and the relation of the client software to the electronic mail inbox and outbox.

FIG. 3 illustrates, in a schematic form, contents of memory 302 of a remote client such as client 102 (FIG. 1.) Memory 302 includes a replicated database 304 and a directory catalog 306. Although the directory catalog 306 is illustrated as independent of the replicated database 304, it may actually be part of the replicated database 304. The database and directory catalog is used by a groupware client 308 in the process of storing and retrieving information and generating and receiving mail messages. In general, the groupware client connects to the groupware mail system, via network 318, by means of an outbox 310 and an inbox 314. In particular, when a user is connected to the network 318, messages arriving at the client are transferred, via an incoming network connection 312 to the inbox 314. The messages can then later be displayed by the client software 308 to the user for reading and response.

In addition, when the client is connected to the network 318 and a mail message is to be sent to a recipient who is in possession of a digital certification, the client software 308 retrieves the user's digital certificate over the network 318 from a public address book associated with the groupware server. The retrieved digital certificate is then used to encrypt the mail message. The encrypted mail message is then placed in the outbox 310 where subsequently it is, either automatically sent to the groupware server, via connection 312 and network 318, or sent at a later time in response to a directive from the user.

In the case where client is not connected to the network 318 when a mail message is generated, the client software 308 can use the directory catalog 306 to obtain information about the recipient, including the recipient's name and mail address. However, since the recipient's digital certificate is not generally included in the directory catalog 306, if the directory catalog 306 indicates that the recipient holds a digital certificate, it is not possible for the mail message to be encrypted and placed in the outbox 310. Therefore, it is not possible, using the conventional system, to compose an mail message to a recipient who holds a digital certificate when the mail client 308 is not connected to the network 318.

Figure 4:
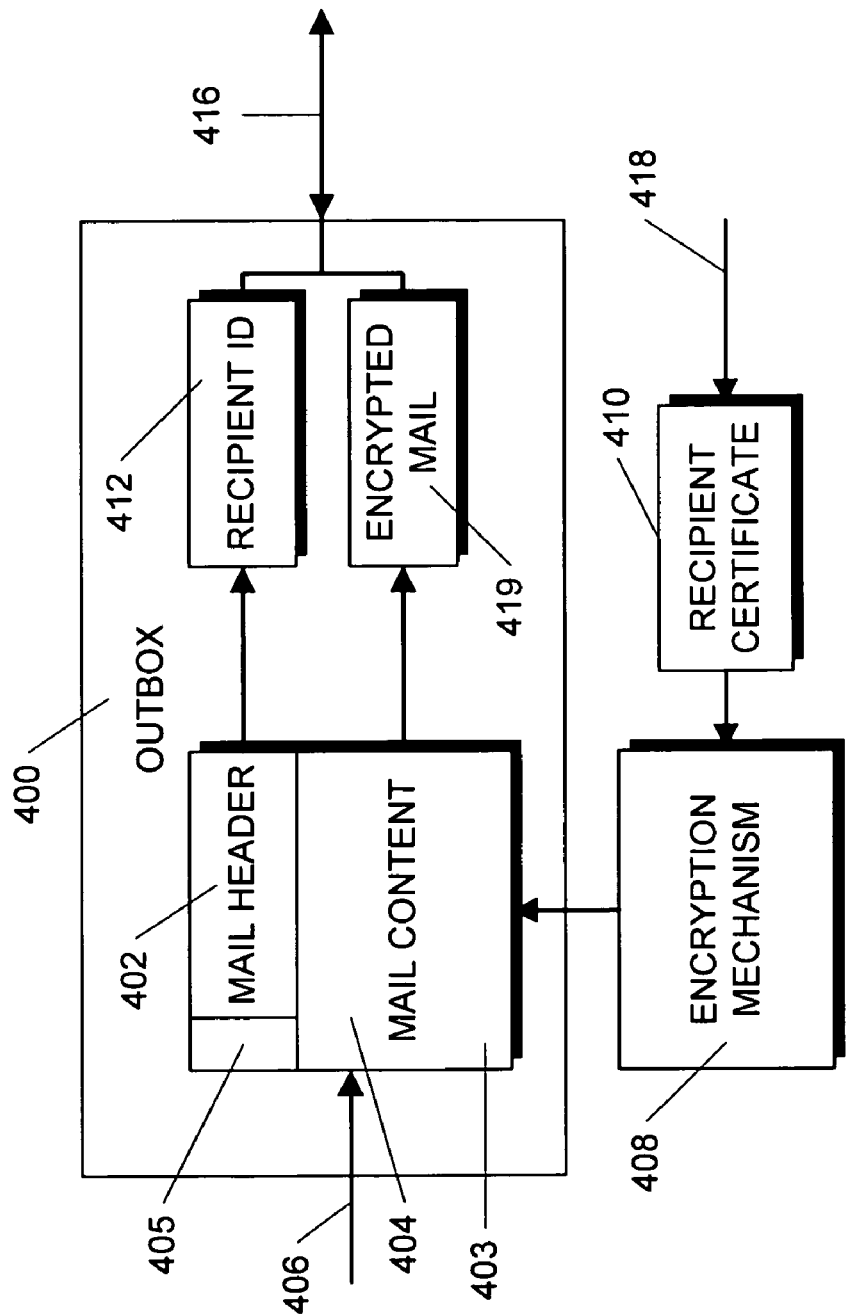
FIG. 4 is a block schematic diagram illustrating the components of an outbox used in the encryption scheme of the present invention.

FIG. 4 illustrates a modification of the standard mail routine in accordance with the principles of the present invention. When a mail message is to be sent by an off line user, the recipient's name and mail address are obtained by the client software 308 from the directory catalog 306 and placed in the header 402 of the mail message 403. The directory catalog 306 also contains information indicating that the recipient holds a digital certificate, and, if this is the case, a flag 405 is placed in the mail header 402 to indicate that a certificate is required. The client software 308 then places the message 403, in plain text form, into outbox 400 as indicated schematically by arrow 406.

At a later time when the remote client is connected to the groupware network 318, the outgoing mail processing routine associated with outbox 310, which would normally send the message 403 in outbox 410 via the network 318 to the groupware server, instead responds to the flag 405 in the mail header 402 by sending a request (indicated schematically as request 412) to the groupware server requesting the recipient's digitial certification from the associated public address book. The certification is requested by using recipient information in the mail header 402 such as the recipient's ID or recipient's name to identify the recipient in the public address book. The request is sent as indicated schematically by arrow 416 to the public address book associated with the groupware server.

If the digital certificate 410 is available, it is returned, as indicated schematically by arrow 418, and provided to an encryption mechanism 408. The encryption mechanism 408 uses the digital certificate to encrypt the mail content 404 and meessage including the header 402 and the encrypted content 414 is then sent as indicated schematically by arrow 416 to the groupware server. In a preferred embodiment, the recipient's digital certificate 410 is then discarded. Alternatively, the certificate may be retained for a predetermined period of time in order to encrypt further messages to be sent to the same recipient.

Figure 5:
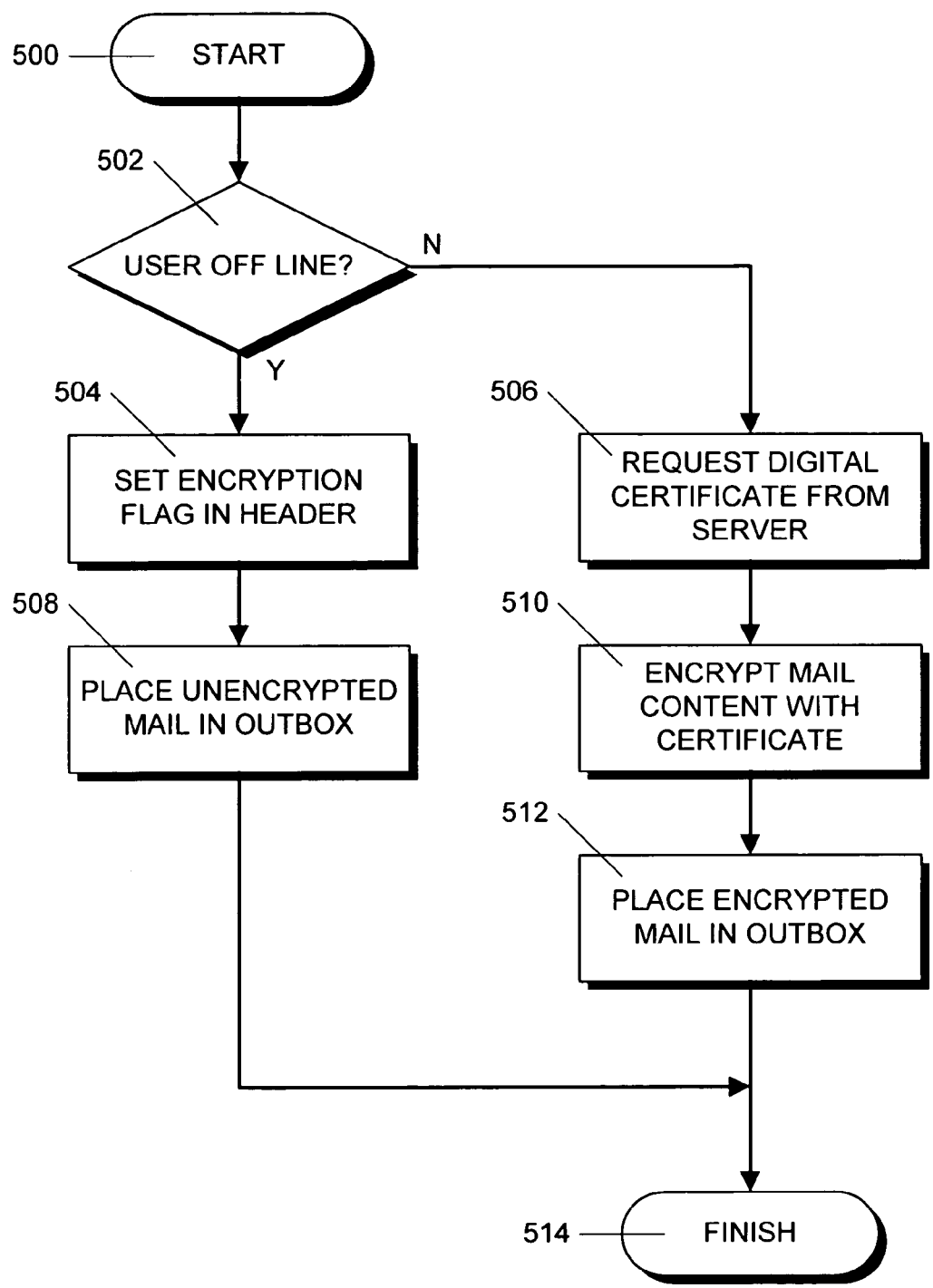
FIG. 5 is a flowchart which illustrates the steps performed in generating a mail message for a recipient who has a digital certificate and placing the message in an outbox using the principles of the present invention.

FIG. 5 is a flowchart illustrating the steps carried out by the client software during the generation of outgoing mail to a recipient who possesses a digital certificate. After the client software has composed the message content and header using either the directory catalog, a local database or the public address book, the routine illustrated in FIG. 5 is performed to complete the outgoing mail process. This process starts in step 500 and proceeds to step 502 in which a determination is made whether the user is off line. If the user is off line, the process proceeds to step 504 in which the encryption flag (405 in FIG. 4) is set in the header 402 of message 403. Then the unencrypted message is placed in the outbox in step 508 and the process finishes in step 514.

Alternatively, if, in step 502, a determination is made that the user is on line, then the process proceeds to step 506 where a request is made to the mail server for the recipient's certificate. Alternatively, the certificate could be obtained from a local database. The certificate is used, in step 510, to encrypt the mail content. In step 512, the encrypted mail is placed in the outbox and the process ends in step 514.

Figure 6:
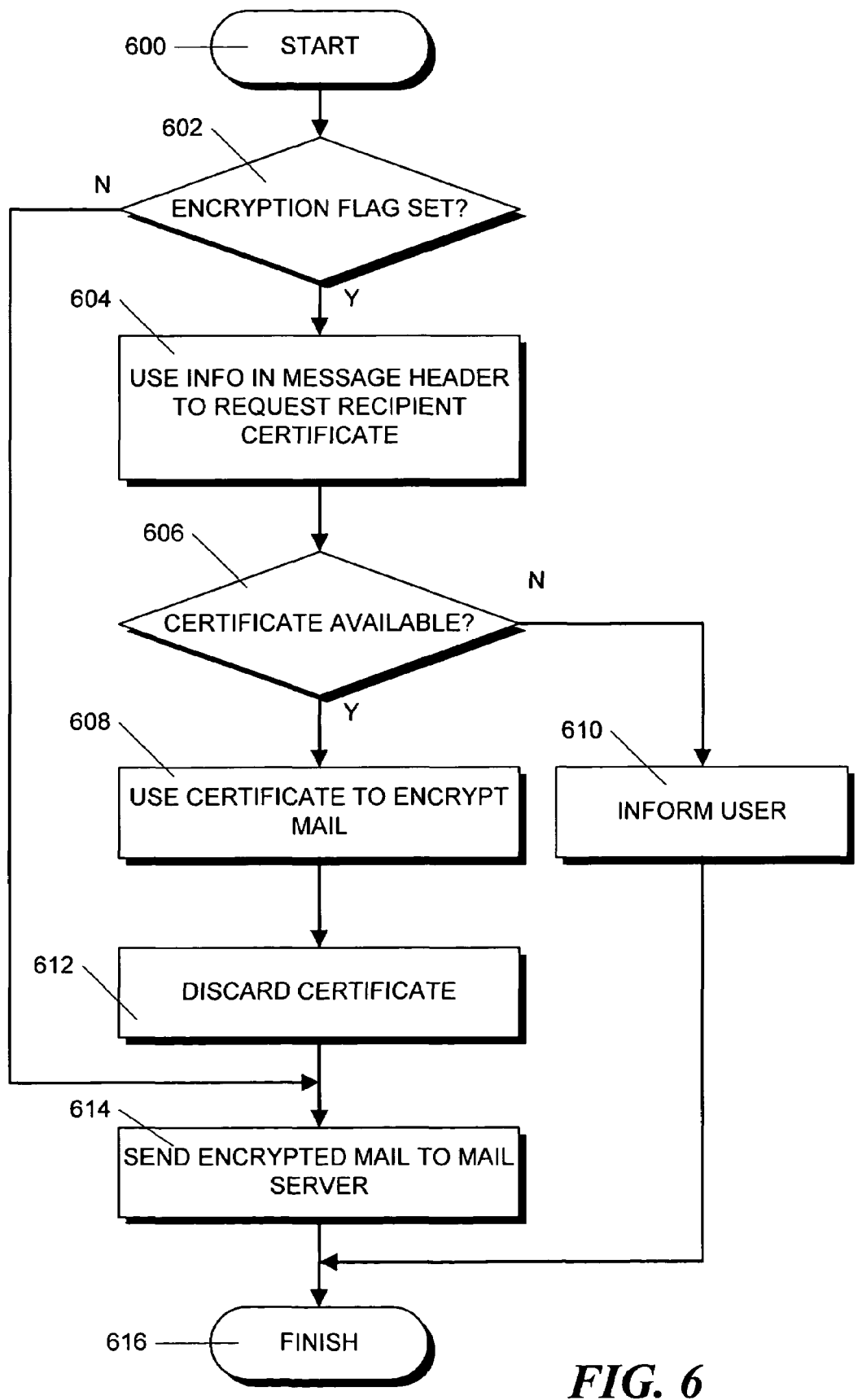
FIG. 6 is a flowchart which illustrates the steps performed in sending mail in an outbox to a recipient who has a digital certificate using the principles of the present invention.

FIG. 6 illustrates the process used to process outgoing mail in the outbox to a recipient who holds a digital certificate. This process might be initiated automatically when an off-line user logs on to the mail network, or might be initiated under an explicit user command. The process starts in step 600 and proceeds to step 602 where the message header is examined to determine whether the encryption flag has been set. If the encryption flag has not been set, then the mail has already been encrypted and is sent to the mail server in step 614. The process then finishes in step 616.

Alternatively, if, in step 602, the encryption flag in the message header indicates that the mail is unencrypted, then the process proceeds to step 604 where information in the message header is used to request the recipient's digital certification from a public address book associated with the groupware server. In step 606, a decision is made whether the certification is available. If the certification is available, it is used to encrypt the mail content as indicated in step 608. Next, in step 612, the certification is discarded. Subsequently, the encrypted mail content is sent to the mail server as indicated in step 614 and the process ends in step 616.

Alternatively, if in step 606 it is determined that the recipient's certificate is not available, then in step 610, the sender is informed and given the choice to send the mail in unencrypted form. Then the routine ends in step 616. If the recipient does not hold a digital certificate, then the mail can be sent in an unencrypted form.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular groupware system, other hardware and software could be used in the same manner as that described. In addition, although only one mail processing routine has been described, other processes could be used to generate mail mesages. Other aspects, such as the specific instructions utilized to achieve a particular function, as well as other modifications to the inventive concept are intended to be covered by the appended claims.

What is claimed is:

1. A method for encrypting an electronic message composed by a sender using an abbreviated address book for delivery over a mail system to a recipient who holds a digital certificate, comprising:
   (a) when the sender is off-line, inserting an encryption flag in a header associated with the electronic message;
   (b) placing the header and the message in plain text in an outbox;
   (c) when the sender is on-line, in response to the flag, requesting the digital certificate from the mail system; and
   (d) using the received certificate to encrypt the plain text mail message.

2. The method according to claim 1 further comprising:
   (e) sending the encrypted mail message to the mail system.

3. The method according to claim 1 further comprising:
   (e) when the sender is on-line, if the flag indicates that the message is encrypted, sending the encrypted mail message to the mail system.

4. The method according to claim 1 wherein step (c) comprises:
   (c1) requesting the digital certificate from the mail system; and
   (c2) if the certificate is unavailable, informing the sender that the message cannot be encrypted.

5. The method according to claim 4 further comprising:
   (e) sending the unencrypted mail message in the outbox to the mail system when the message cannot be encrypted.

6. The method according to claim 1 wherein the header comprises information identifying the recipient and step (c) comprises:
   (c1) using the identifying information to locate the recipient in the mail system and to retrieve the certificate.

7. Apparatus for encrypting an electronic message composed by a sender using an abbreviated address book for delivery over a mail system to a recipient who holds a digital certificate, comprising:
   a mail composer which inserts an encryption flag in a header associated with the electronic message when the sender is off-line, the encryption flag indicating that the electronic message is unencrypted;
   a sending mechanism which places the header and the message in plain text in an outbox;
   a verification mechanism which is operable when the sender is on-line and, in response to the flag, requests the digital certificate from the mail system; and
   an encryption mechanism which uses the received certificate to encrypt the plain text mail message.

8. The apparatus according to claim 7 further comprising:
   an outbox mechanism which sends the encrypted mail message to the mail system.

9. The apparatus according to claim 7 further comprising:
   a mail mechanism which operates when the sender is on-line and, if the flag indicates that the message is encrypted, sends the encrypted mail message to the mail system.

10. The apparatus according to claim 7 wherein the verification mechanism comprises:
    a mechanism which requests the digital certificate from the mail system; and
    warning apparatus which informs the sender that the message cannot be encrypted if the certificate is unavailable.

11. The apparatus according to claim 10 further comprising:
    an outbox mechanism which sends the unencrypted mail message in the outbox to the mail system when the message cannot be encrypted.

12. The apparatus according to claim 7 wherein the header comprises information identifying the recipient and wherein the verification apparatus comprises:
    a locator which uses the identifying information to locate the recipient in the mail system and to retrieve the certificate.

13. A computer program product for encrypting an electronic message composed by a sender using an abbreviated address book for delivery over a mail system to a recipient who holds a digital certificate, the computer program product comprising a computer readable medium having computer readable program code thereon, including:
    program code operable when the sender is off-line, for inserting an encryption flag in a header associated with the electronic message, the encryption flag indicating that the electronic message is unencrypted;
    program code for placing the header and the message in plain text in an outbox;
    program code operable when the sender is on-line and, in response to the flag, for requesting the digital certificate from the mail system; and
    program code for using the received certificate to encrypt the plain text mail message.

14. The computer program product according to claim 13 further comprising:
    program code for sending the encrypted mail message to the mail system.

15. The computer program product according to claim 13 further comprising:
    program code operable when the sender is on-line and, if the flag indicates that the message is encrypted, for sending the encrypted mail message to the mail system.

16. The computer program product according to claim 13 wherein the program code for requesting the certificate comprises:

program code for requesting the digital certificate from the mail system; and program code for informing the sender that the message cannot be encrypted, if the certificate is unavailable.

17. The computer program product according to claim 16 further comprising:

program code for sending the unencrypted mail message in the outbox to the mail system when the message cannot be encrypted.

18. The computer program product according to claim 13 wherein the header comprises information identifying the recipient and the program code for requesting the certificate comprises:

program code for using the identifying information to locate the recipient in the mail system and to retrieve the certificate.

19. A computer data signal embodied in a computer readable medium for encrypting an electronic message composed by a sender using an abbreviated address book for delivery over a mail system to a recipient who holds a digital certificate, the computer data signal comprising:

program code operable when the sender is off-line, for inserting an encryption flag in a header associated with the electronic message, the encryption flag indicating that the electronic message is unencrypted;

program code for placing the header and the message in plain text in an outbox;

program code operable when the sender is on-line and, in response to the flag, for requesting the digital certificate from the mail system; and program code for using the received certificate to encrypt the plain text mail message.

20. The computer data signal according to claim 19 further comprising:

program code for sending the encrypted mail message to the mail system.

* * * * *